US009039790B2

(12) United States Patent
Kalnes

(10) Patent No.: US 9,039,790 B2
(45) Date of Patent: May 26, 2015

(54) HYDROPROCESSING OF FATS, OILS, AND WAXES TO PRODUCE LOW CARBON FOOTPRINT DISTILLATE FUELS

(75) Inventor: Tom N. Kalnes, Lagrange, IL (US)

(73) Assignee: UOP LLC, Des Plaines, IL (US)

( * ) Notice: Subject to any disclaimer, the term of this patent is extended or adjusted under 35 U.S.C. 154(b) by 334 days.

(21) Appl. No.: 12/969,404

(22) Filed: Dec. 15, 2010

(65) Prior Publication Data
US 2012/0151828 A1 Jun. 21, 2012

(51) Int. Cl.
*C10L 1/18* (2006.01)
*C10L 1/00* (2006.01)
*C10G 47/00* (2006.01)
*C10G 3/00* (2006.01)

(52) U.S. Cl.
CPC ........... *C10L 1/00* (2013.01); *C10L 2200/0476* (2013.01); *C10G 47/00* (2013.01); *C10G 3/42* (2013.01); *C10G 3/50* (2013.01); *C10G 2300/1014* (2013.01); *C10G 2300/1022* (2013.01); *C10G 2300/4081* (2013.01)

(58) Field of Classification Search
CPC .............. C10G 2300/1014; C10G 2300/1022; C10G 2300/4081; C10G 3/42; C10G 3/50; C10G 47/00; C10L 1/00; C10L 2200/0476
USPC ............................ 44/307, 308, 385, 403, 443
See application file for complete search history.

(56) References Cited

U.S. PATENT DOCUMENTS

| | | | |
|---|---|---|---|
| 4,210,103 A | 7/1980 | Dimitroff et al. | |
| 4,670,613 A | 6/1987 | Ruyter et al. | |
| 4,836,146 A | 6/1989 | Russell | |
| 4,992,605 A | 2/1991 | Craig | |
| 5,180,868 A | 1/1993 | Baker et al. | |
| 5,961,786 A | 10/1999 | Freel et al. | |
| 7,578,927 B2 | 8/2009 | Marker et al. | |
| 7,619,012 B2 | 11/2009 | Norbeck et al. | |
| 7,838,272 B2 * | 11/2010 | Miller | 435/167 |
| 2005/0032920 A1 | 2/2005 | Norbeck et al. | |
| 2005/0210739 A1 * | 9/2005 | Esen et al. | 44/605 |
| 2005/0256212 A1 | 11/2005 | Norbeck et al. | |
| 2006/0186020 A1 | 8/2006 | Gomes | |
| 2007/0039240 A1 | 2/2007 | Carroway | |
| 2007/0161832 A1 | 7/2007 | Myllyoja et al. | |
| 2008/0092436 A1 | 4/2008 | Seames et al. | |
| 2008/0244962 A1 | 10/2008 | Abhari et al. | |
| 2008/0312480 A1 | 12/2008 | Dindi et al. | |
| 2009/0000185 A1 | 1/2009 | Aulich et al. | |
| 2009/0077865 A1 | 3/2009 | Kalnes et al. | |
| 2009/0077866 A1 | 3/2009 | Kalnes et al. | |
| 2009/0077868 A1 | 3/2009 | Brady et al. | |
| 2009/0218062 A1 | 9/2009 | Schinski et al. | |
| 2009/0229172 A1 | 9/2009 | Brady et al. | |
| 2009/0229174 A1 | 9/2009 | Brady et al. | |
| 2009/0283442 A1 | 11/2009 | McCall et al. | |
| 2009/0300970 A1 | 12/2009 | Perego et al. | |
| 2009/0321311 A1 | 12/2009 | Marker et al. | |
| 2010/0076238 A1 * | 3/2010 | Brandvold et al. | 585/324 |
| 2010/0146847 A1 * | 6/2010 | Stevens et al. | 44/443 |
| 2010/0160698 A1 | 6/2010 | Perego et al. | |

FOREIGN PATENT DOCUMENTS

| | | |
|---|---|---|
| CA | 536549 A | 1/1957 |
| EP | 0450861 A2 | 10/1991 |
| EP | 0510771 A1 | 10/1992 |
| EP | 0718392 A1 | 6/1996 |
| WO | 0176736 A1 | 10/2001 |
| WO | 0202489 A1 | 1/2002 |
| WO | 0207882 A1 | 1/2002 |
| WO | 2004005438 A1 | 1/2004 |
| WO | 2006070018 A1 | 7/2006 |
| WO | 2006100584 A2 | 9/2006 |
| WO | 2008035155 A2 | 3/2008 |
| WO | 2008104929 A1 | 9/2008 |
| WO | 2008124852 A2 | 10/2008 |

OTHER PUBLICATIONS

Higman, C. et al.; Chapter 5, "Gassification Processes"; Library of Congress Cataloging-in-Publication Data, ISBN-13: 978-0-7506-7707-3, ISBN-10: 0-7506-7707-4 (hc: alk. paper), 1. Coal gassification, I. Burgt, Maarten van der, II. Title., TP759.H54 2003, 665.7'72-dc21; p. 85-170 (2003).

Demirbas, Ayhan; "Conversion of biomass to a pyrolytic oil for blending gasoline as an alternative fuel in internal combustion engines"; Source: Energy Sources, v. 23, n. 6, p. 553-562, Jul. 2001.

Gregor, J.H.; UOP Inc; Sasol Ltd; "Fischer-Tropsch [synthesis (TDS)] products as liquid fuels or chemicals. An economic evaluation"; Source: AIChE 1990 Spring National Meeting (Orlando Mar. 18-22, 1990) Catalysis Letters (ISSN 1011—372X) v. 7, n. 1-4, p. 317-31 (Nov. 1990); Kluwer Academic Publishers.

Liu, D.D.S. et al.; "Production of high quality cetane enhancer from depitched tall oil"; Source: AIChE 1996 National Meeting (Chicago Nov. 10-15, 1996) (Condensation) Petroleum Science and Technology (ISSN 1091-6466), v. 16, n. 5-6, p. 597-609 (1998).

Srivastava, Anjana et al.; "Triglycerides-based diesel fuels"; H.B. Technological Inst; Source: Renewable and Sustainable energy Reviews, v. 4, n. 2, p. 111-133 (2000).

Banapurmath, N.R. et al.; "Experimental investigations of a four-stroke single cylinder direct injection diesel engine operated on dual fuel mode with producer gas as inducted fuel and Honge oil and its methyl ester (HOME) as injected fuels"; Source: Renewable Energy, v. 33, n. 9, p. 2007-2018; Elsevier Ltd (2008).

(Continued)

*Primary Examiner* — James Goloboy
*Assistant Examiner* — Latosha Hines

(57) ABSTRACT

Methods for making a fuel composition comprising contacting one or more components of a hydroprocessing feedstock, for example both a fatty acid- or triglyceride-containing component and a paraffin-rich component, with hydrogen under catalytic hydroprocessing conditions are disclosed. The methods are effective to upgrade the component(s) and provide a hydroprocessed biofuel. A representative method utilizes a single-stage process in which hydrogen-containing recycle gas is circulated through both a hydrodeoxygenation zone and a hydrocracking zone in series.

7 Claims, 1 Drawing Sheet

(56) References Cited

OTHER PUBLICATIONS

Demirbas, A.; "Prodution of biodiesel from tall oil"; Source; Energy Sources, Part A; Recovery, Utilization and Environmental Effects, v. 30, n. 20, p. 1896-1902; Taylor and Francis Inc. (2008).

Marker, T.L. et al.; "Green Diesel Production from Vegetable Oil"; UOP LLC, 25 E. Algonquin Rd., Des Plaines, IL 60017, Refining Process Development, Refining, Eni, Milan, Italy, (2007).

Neaves, D.E. et al.; "Evaluation of tall oil as a feedstock for the production of biodiesel"; Source: AIChE Annual Meeting, Conference Proceedings 2006 p. 1, 2006 AIChE Annual Meeting, 2006, San Francisco, CA American Institute of Chemical Engineers.

Keskin, A. et al.; "Influence of tall oil biodiesel with Mg and Mo based fuel additives on diesel engine performance and emission"; Source: Bioresource Technology, v. 99, n. 14, p. 6434-6438; Elsevier Ltd (2008).

Thisdell, G.; "Rintenko: Finland: Designs on engineering renewable technology"; Source: European Chemical News, v. 83, n. 2172, p. 31; Reed Business Information Ltd (2005).

Keskin, A. et al.; "Biodiesel production from tall oil with synthesized Mn and Ni based additives: Effects of the additives on fuel consumption and emissions"; Source: Fuel, v. 86, n. 7/8, p. 1139-1143; Elsevier Ltd (2007).

Karabektas, M. et al.; "The effects of preheated cottonseed oil methyl ester on the performance and exhaust emissions of a diesel engine"; Source: Applied Thermal Engineering, v. 28, n. 17/18, p. 2136-2143; Elsevier Ltd (2008).

Herman, U. et al.; "Green Diesel from Biomass via Fischer-Tropsch synthesis: New Insights in Gas Cleaning and Process Design Harold Boerrigter": Energy Research Centre of the Netherlands (ECN); Shell Global Solutions International B.V., The Hague, The Netherlands, www.senternovem.nl/mmfiles/28277 tcm24-279917.pdf, (2002).

Rajvanshi, A.K.; "Biomass Gasification"; Ch. 4 of Alternative Energy in Agriculture, v. II, p. 83-102 CRC Press (1986).

Bridgwater, A.V.; "Biomass Fast Pyrolysis"; Source: Review paper BIBLID: 0354-9836, 8 (2004), 2, 21-49.

\* cited by examiner

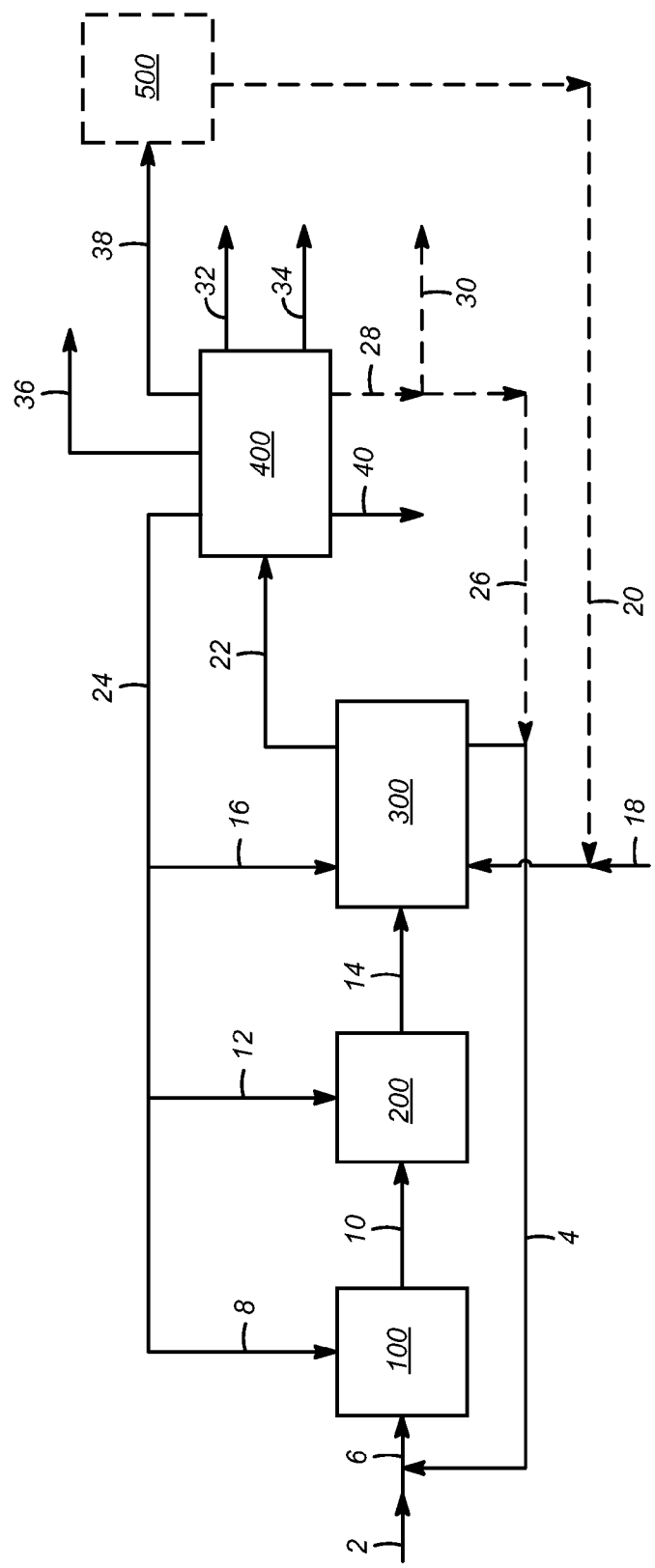

HYDROPROCESSING OF FATS, OILS, AND WAXES TO PRODUCE LOW CARBON FOOTPRINT DISTILLATE FUELS

FIELD OF THE INVENTION

Embodiments of the invention relate to the hydroprocessing of both a fatty acid- or triglyceride-containing component and a paraffin-rich component (e.g., a Fischer-Tropsch wax derived from synthesis gas), as well as hydroprocessed biofuels (e.g., diesel fuel) made from this co-processing. The present invention also relates to such hydroprocessing methods, utilizing both hydrotreating and hydrocracking reaction zones and a product recovery section that is optionally integrated with hydrogen generation from biomass-derived $C_4^-$ byproducts, in order to further reduce the carbon footprint of the biofuel.

DESCRIPTION OF RELATED ART

Environmental concerns over fossil fuel greenhouse gas (GHG) emissions have led to an increasing emphasis on renewable energy sources. Wood and other forms of biomass including agricultural and forestry residues are examples of some of the main types of renewable feedstocks being considered for the production of liquid fuels. Energy from biomass based on energy crops such as short rotation forestry, for example, can contribute significantly towards the objectives of the Kyoto Agreement in reducing GHG emissions.

Gasification is a known process for the conversion of a wide range of carbonaceous materials, such as coal and natural gas, into a gaseous mixture containing carbon monoxide and hydrogen, referred to as synthesis gas or syngas. The process involves contacting the raw material in a gasification reactor with a controlled amount of oxygen and/or steam to achieve partial oxidation but not complete combustion. Representative processes for coal gasification to syngas are described, for example, in WO 2006/070018; U.S. Pat. No. 4,836,146; and WO 2004/005438. In the case of biomass gasification, in which the source of carbon is renewable, the incomplete combustion generally results in a mixture called producer gas, which includes small amounts of methane in addition to the CO and $H_2$. See, for example, Rajvanshi, A. K., "Biomass Gasification," Ch. 4 of ALTERNATIVE ENERGY IN AGRICULTURE, Vol. II, CRC Press, 1986, pp. 83-102. Other known routes for the production of syngas from biomass include "hydro-gasification" (gasification in the presence of hydrogen), to generate methane, followed by steam reforming, pyrolytic reforming, or steam pyrolysis of the methane. Representative processes are described, for example in U.S. Pat. No. 7,619,012; US Publication 2005/0256212; and US Publication 2005/0032920.

Once syngas is obtained, the Fischer-Tropsch (F-T) process can be used for the further synthesis, from this feed, of paraffinic hydrocarbons having from one carbon atom (methane) to 200 carbon atoms or even more. In particular, the syngas is fed to an F-T reactor where it is converted over a suitable catalyst at elevated temperature and pressure into these hydrocarbons. The F-T process is described, for example, in WO 02/02489, WO 01/76736, WO 02/07882, EP 0 510 771 and EP 0 450 861. The combination of biomass gasification and F-T synthesis therefore provides a Biomass to Liquid (BTL) pathway for producing renewable fuel components.

In addition to BTL, another pathway for the production of biofuels including diesel fuel and aviation fuel fractions is through the hydroprocessing of fatty acids and/or triglycerides from renewable feedstocks. These include plant oils such as corn, rapeseed, canola, soybean, jatropha, camelina, castor, salicornia, pennycress, and algal oils, animal fats such as inedible tallow, fish oils and various waste streams such as yellow and brown greases and sewage sludge. The common feature of these feedstock components is that they are composed of triglycerides and Free Fatty Acids (FFA), both of which contain aliphatic carbon chains having from 8 to 24 carbon atoms. The aliphatic carbon chains in the triglycerides or FFAs can also be mono-, di- or poly-unsaturated. Some of the glycerides from these renewable feedstock components may be monoglycerides or diglycerides instead of, or in addition to, the triglycerides. Conversion of these components to biofuels suitable for use as transportation fuels, or otherwise for blending into such fuels with a petroleum derived component, generally involves a number of hydroprocessing reactions (e.g., hydrogenation and deoxygenation, which includes decarboxylation, decarbonylation, and/or hydrodeoxygenation, as well as other reactions including hydroisomerization and hydrocracking) to convert the triglycerides and FFA into hydrocarbons having an acceptable molecular weight (and boiling point) range for a given type of fuel. Representative conversion processes are described, for example, in US Publication Nos. 2009/0077865, 2009/0077866, 2009/0077868, 2009/0229172, 2009/0229174, 2009/0283442, 2009/0300970, 2009/0321311, 2010/0076238, and 2010/0160698.

The development of fuel compositions, and particularly those useful as transportation fuels, which are derived at least partly from renewable feedstocks such as biomass, is an ongoing objective of major industrial importance. Of significant interest are compositions, or fractions useful for blending into compositions, having characteristics (e.g., energy content, distillation curve, and density) that are representative of their counterpart petroleum derived compositions or blending fractions, used for the same intended purpose (e.g., as diesel fuel). Of further interest are methods for producing such compositions and fractions in a manner that exploits processing synergies and/or economies of scale, thereby resulting in the lowest possible carbon footprint, based on a lifecycle assessment of their GHG emissions.

SUMMARY OF THE INVENTION

The present invention is associated with the discovery of fuel compositions exhibiting reduced greenhouse gas (GHG) emissions, based on a lifecycle assessment (LCA) from the time of cultivation of feedstocks (in the case of plant materials used as biomass) required for the compositions, up to and including the ultimate combustion of the fuel composition by the end user. For waste vegetable oils and animal fats, the GHG emissions associated with obtaining these feedstocks are in many cases considered negligible, as these biofuel sources are otherwise normally waste products of foods already produced for human and animal consumption. The compositions described herein are prepared by co-processing at least two distinct hydroprocessing feedstocks, either or both of which are derived from renewable sources of carbon (e.g., biomass and fats). Advantageously, co-processing results in an upgraded, hydroprocessed product (or an upgraded, hydroprocessed biofuel as a hydroprocessed product fraction) having suitable characteristics, in terms of composition (e.g., relatively large, minimally required, amounts of hydrocarbons within a particular boiling range) and in terms of quality (e.g., relatively small, or maximally allowed, amounts of thermally unstable compounds such as oxygenates) for use as a fuel composition or component thereof.

Aspects of the invention relate to the use hydroprocessing to simultaneously upgrade (i) a fatty acid- or triglyceride-containing hydroprocessing feedstock together with (ii) a hydroprocessing feedstock that is rich in paraffins, for example the highly paraffinic product obtained from gasification and Fischer-Tropsch (F-T) synthesis. Animal fats and vegetable oils, either in their crude form or pretreated prior to hydroprocessing, typically contain a higher oxygen content (typically about 10-12% organic oxygen) and a lower energy content (typically about 15-20% lower), relative to petroleum derived liquid fuel fractions. Other properties of the fatty acids and triglycerides in these fats and oils render them generally less favorable, compared to petroleum derived fractions, as components of a transportation fuel composition.

Likewise, the products of Biomass to Liquid (BTL) pathways described above, which include the products of gasification followed by F-T synthesis, are generally of significantly lower quality, compared to their counterpart, paraffin-rich petroleum derived products used for fuel blending. This quality deficit results from the presence of oxygenates and possibly olefins, with amounts of these non-paraffin impurities depending on the F-T catalyst and processing conditions used. In addition, F-T waxes have a wide carbon number (and consequently molecular weight) distribution and very poor cold flow properties. Both of these characteristics may be improved using hydrocracking, as a specific hydroprocessing reaction, to convert F-T waxes into a paraffin-rich component, with a lower average molecular weight (and narrower molecular weight distribution) a greater degree of branching (or content of isoparaffins), in order to meet specifications for blending into distillate fuels such as aviation and diesel fuel.

Hydroprocessing of both a fatty acid- or triglyceride-containing component and a paraffin-rich component (e.g., derived from coal, natural gas, or biomass) provides simultaneous upgrading of at least these two components, which, following fractionation of the resulting, hydroprocessed product, can provide a hydroprocessed biofuel meeting applicable composition and quality standards. In addition, the oxygenate content of the fatty acid- or triglyceride-containing component, which is generally significantly higher than that of the paraffin-rich component (e.g., derived from F-T synthesis), is diluted during hydroprocessing. This further simplifies the overall process, by reducing adiabatic temperature rise and the corresponding production of undesirable coke precursors. According to embodiments of the invention, involving co-processing of an "aromatic-rich" component described below, a biofuel that does not require further blending with aromatic hydrocarbons, such as an on-spec diesel biofuel, is obtained after hydroprocessing and fractionation.

Embodiments of the invention therefore relate to novel production methods for fuel compositions that are at least partially, but often completely, derived from renewable carbon sources. These sources include a fatty acid- or triglyceride-containing component and a paraffin-rich component that may likewise be derived from renewable carbon (e.g., from the BTL pathway, combining gasification of biomass and F-T synthesis, as described above). Representative methods comprise contacting these components with hydrogen together in a common hydroprocessing reactor to achieve efficiencies and other advantages, as discussed herein, compared to separately upgrading these components. Following fractionation of the hydroprocessed product, the resulting hydroprocessed biofuel (e.g., a hydroprocessed diesel biofuel, having a significant quantity of paraffinic and iso-paraffinic hydrocarbons) may be used in neat form (e.g., as a diesel fuel) or otherwise blended, for example, with conventional petroleum derived blending stocks. Whether or not the hydroprocessed biofuel is blended, the carbon footprint of the resulting neat biofuel or blended biofuel can be reduced.

Other embodiments of the invention relate to production methods for hydroprocessed biofuel exhibiting a GHG emission, based on LCA, which is further reduced by virtue of using a renewable carbon-derived source of hydrogen for the hydroprocessing step. In particular, byproducts (e.g., light hydrocarbons) of hydroprocessing and/or F-T synthesis can be converted, according to an overall hydroprocessed biofuel production process, in an integrated hydrogen generation unit. For example, a catalytic steam reformer may be integrated with one or both of a catalytic hydroprocessing unit and a F-T synthesis unit. Therefore, at least a portion of the byproducts of any one or more of these operations may be converted to hydrogen (e.g., by catalytic steam reforming), thereby generating at least a portion of the hydrogen required for hydroprocessing. Importantly, the generation of hydrogen in this manner (i.e., from byproducts obtained from the processing of feedstocks comprising renewable carbon) beneficially reduces the amount of hydrogen that must be obtained from external fossil sources (imported), thereby further lowering the lifecycle GHG emission value of the resulting hydroprocessed biofuel. According to other embodiments in which gasification and F-T synthesis are used to provide the paraffin-rich component, a portion of the syngas from gasification can be purified and used as a renewable source of hydrogen for hydroprocessing.

Representative production methods include the gasification of a biomass feedstock, such as a second generation (e.g., lignocellulosic) biomass feedstock, followed by F-T synthesis, to provide the paraffin-rich component. Both this component and the fatty acid- or triglyceride-containing component may optionally be obtained after separation from (e.g., by fractionation), and/or pretreatment of, the F-T synthesis product or a fatty acid-containing product (e.g., waste animal fat or vegetable oil), respectively, prior to hydroprocessing. In any event, the subsequent hydroprocessing of these components beneficially reduces their total oxygen content and increases their total heating value.

The methods can further comprise separating an effluent or product of hydroprocessing (e.g., a hydrotreating or hydrocracking reactor effluent that has been separated or stripped in the presence of flowing hydrogen), for example, by fractionation and/or absorption, to provide the hydroprocessed biofuel as a hydroprocessed product fraction (e.g., a hydroprocessed aviation biofuel, a hydroprocessed naphtha, etc.) comprising hydrocarbons having normal boiling points characteristic of their counterpart petroleum derived fractions used for the same application. It is also possible to blend such petroleum derived fractions, in a subsequent blending step, to provide the fuel compositions having a reduced carbon footprint (i.e., exhibiting reduced GHG emissions based on their LCA), by virtue of at least part of the carbon content of the compositions being renewable.

Further embodiments of the invention relate to methods of preparing fuel compositions. Representative methods comprise blending a hydroprocessed product fraction, and particularly a hydroprocessed biofuel made according to methods described herein, with a petroleum derived component. Representative amounts of the hydroprocessed product fraction (e.g., a hydroprocessed diesel biofuel) and petroleum derived components are also described herein.

These and other embodiments and aspects relating to the present invention are apparent from the following Detailed Description.

BRIEF DESCRIPTION OF THE DRAWING

The FIGURE depicts a representative process for the hydroprocessing of at least two components, for example a fatty acid- or triglyceride-containing feedstock and a paraffin-rich component, according to aspects of the invention.

FIG. 1 should be understood to present an illustration of the invention and/or principles involved. A simplified process flowscheme is used, in order to facilitate explanation and understanding. Details including pumps, heaters and heat exchangers, valves, instrumentation, and other items not essential to the understanding of the invention are not shown. As is readily apparent to one of skill in the art having knowledge of the present disclosure, methods for providing hydroprocessed biofuels according to various other embodiments of the invention, will have configurations and components determined, in part, by their specific use.

DETAILED DESCRIPTION

Representative methods for making a fuel composition, according to embodiments of the invention, comprise contacting a fatty acid- or triglyceride-containing feedstock and a paraffin-rich component with hydrogen under catalytic hydroprocessing conditions effective to deoxygenate and upgrade both of these components simultaneously and provide a hydroprocessed biofuel meeting industry specifications. Representative hydroprocessed biofuels include hydroprocessed distillates such as a hydroprocessed diesel biofuel or a hydroprocessed aviation biofuel. The simultaneous co-processing results in efficiencies and other advantages as described above. Preferably the paraffin-rich component is derived from biomass and the triglyceride component is obtained from animal fat, a plant-derived oil, or a combination thereof, to provide a hydroprocessed biofuel having a carbon content that is all or substantially all derived from renewable carbon. The carbon footprint of the biofuel is thereby greatly reduced according to U.S. government greenhouse gas (GHG) emission accounting practices, in which emissions associated with the combustion of biomass derived fuels, as well as fuels derived from natural oils (i.e., animal fats or plant-derived oils), are not reported in the lifecycle assessment (LCA) of the GHG emission value, since biomass is renewed over a very short time frame compared to petroleum derived components. Of particular interest with respect to the biofuel compositions described herein are distillate fuels such as diesel and aviation fuels.

Biomass suitable as a renewable carbon source includes lignocellulosic materials that are subjected to gasification followed by Fischer-Tropsch (F-T) synthesis to provide an F-T derived synthetic hydrocarbon mixture (e.g., synthetic paraffinic kerosene (SPK)) that, following optional pretreatment (e.g., fractionation), serves as a paraffin-rich component. Representative types of biomass are plant materials (or mixtures of plant materials) which may include a hardwood (e.g., whitewood), a softwood, or a hardwood or softwood bark. Energy crops, or otherwise agricultural residues (e.g., logging residues) or other types of plant wastes or plant-derived wastes, may also be used as plant materials. Specific exemplary plant materials include corn fiber, corn stover, and sugar cane bagasse, in addition to "on-purpose" energy crops such as switchgrass, miscanthus, and algae. Short rotation forestry products, as energy crops, include alder, ash, southern beech, birch, eucalyptus, poplar, willow, paper mulberry, Australian blackwood, sycamore, and varieties of paulownia elongate. Other examples of suitable biomass include organic waste materials, such as waste paper and construction, demolition, and municipal wastes.

These types of biomass can therefore serve as a renewable carbon source for the paraffin-rich component, for example obtained according to a Biomass to Liquid (BTL) pathway involving F-T synthesis as discussed above. Other types of biomass include waste plastic, rubber, manure, and biosolids from waste water (sewage) treatment, which may also be employed as feedstocks in the methods described herein.

Fatty Acid- or Triglyceride-Containing Component

Renewable hydroprocessing feedstocks comprising fatty acids and/or triglycerides include naturally occurring fats and oils. Typically these contain both fatty acids and triglycerides, with the possible additional presence of monoglycerides and diglycerides that may be processed as well. The fatty acid- or triglyceride-containing component may alternatively comprise derivative classes of compounds such as fatty acid alkyl esters (FAAE), which include fatty acid methyl esters (FAME) and fatty acid ethyl esters (FAEE). Examples of animal fats and vegetable oils suitable for use in the fatty acid- or triglyceride-containing component include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, camelina oil, jatropha oil, crambe oil, tallow, yellow and brown greases, lard, train oil, fats in milk, fish oil, algal oil, sewage sludge, and the like. Mixtures of these fats and/or oils can also be used. The fatty acids and glycerides of the typical animal fat or vegetable oil contain aliphatic hydrocarbon chains in their structures, with the majority of these chains having from about 8 to about 24 carbon atoms. Most of these fats and oils contain significant concentrations of fatty acids with 16 and 18 carbon atoms.

Paraffin-Rich Component

The paraffin-rich component generally comprises non-cyclic, and predominantly straight-chain paraffinic and olefinic hydrocarbons, for example in an amount of generally from about 50% to about 98%, and typically from about 75% to about 97%, by weight. The amount of cyclic compounds in the paraffin-rich component is generally less than about 3%, and often less than about 1%, by weight. A representative paraffin-rich component is obtained from a combination of gasification, for example of a biomass feedstock, to provide syngas, followed by F-T synthesis to provide the mixture of non-cyclic paraffinic and olefinic hydrocarbons, in proportions governed substantially by the catalyst system used. In general, a representative paraffin-rich component is the product of a BTL pathway as discussed above, although F-T synthesis can be also used to obtain the paraffin-rich component, as a product of a Coal to Liquid (CTL) or Natural Gas to Liquid (GTL) pathway. Like the fatty acid- or triglyceride-containing component, the paraffin-rich component may also generally be obtained after further processing steps, which in this case include separation from (e.g., by fractionation), and/or pretreatment of, a BTL product or other Fischer-Tropsch synthesis product, prior to hydroprocessing. For example, the normally liquid phase product of this synthesis may be separated from normally gas phase by-products such as light hydrocarbons, as well as from other by-products, such as water, according to known methods.

F-T synthesis of liquid fuel refers to a process for converting syngas, namely a mixture of CO and $H_2$, into hydrocarbons of advancing molecular weight according to the reaction:

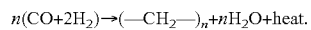

$n(CO+2H_2) \rightarrow (-CH_2-)_n + nH_2O + \text{heat}$.

Products of the F-T synthesis reaction may therefore range from methane to heavy paraffin waxes. Normally, the production of methane is minimized and a substantial portion of the hydrocarbons produced have a carbon chain length of a least 5 carbon atoms. Therefore, $C_5^+$ hydrocarbons are present in the F-T reaction product in an amount generally of at least about 60% (e.g., from about 60% to about 99%), and typically at least about 70% (e.g., from about 70% to about 95%) by weight. These amounts are also representative of those in the paraffin-rich product, even following conventional removal of light hydrocarbon (e.g., methane and ethane) byproducts and water.

F-T synthesis is carried out in the presence of an appropriate catalyst and generally at elevated temperatures, for example from about 125° C. (257° F.) to about 350° C. (662° F.), and typically from about 175° C. (347° F.) to about 275° C. (527° F.). Suitable absolute pressures are generally from about 0.5 MPa (75 psig) to 15 MPa (2200 psig), and typically from about 0.7 MPa (100 psig) to about 3.5 MPa (500 psig). The F-T synthesis may be carried out in a multi-tubular reactor, a slurry phase regime or an ebullating bed regime, wherein the catalyst particles are kept in suspension by an upward superficial gas and/or liquid velocity.

Representative catalysts for the F-T synthesis of hydrocarbons comprise, as the catalytically active component, a metal from Group VIII of the periodic table, which is typically selected from ruthenium, iron, cobalt, nickel and mixtures thereof. The catalytically active metal or combination of metals is normally disposed on a carrier, which may be a porous inorganic refractory oxide, such as alumina, silica, titania, zirconia or mixtures thereof. The amount of catalytically active metal may range generally from about 1% to about 50% by weight, and typically from about 2% to about 30% by weight. The catalytically active metal may be present in the catalyst in combination with one or more metal promoters or co-catalysts. These promoters may be metals or metal oxides, for example the oxides of metals selected from Groups IIA, IIIB, IVB, VB, VIIB and/or VIII of the Periodic Table, or oxides of the lanthanides and/or the actinides. Particular representative F-T catalysts comprise iron or cobalt as the catalytically active metal and further comprise a promoter selected from the group consisting of zirconium, manganese, and vanadium. Iron-containing F-T catalysts are preferred for syngas feeds having a low $H_2$ content, such as those derived from biomass, as this metal also promotes the water-gas shift reaction to increase $H_2$ availability. Other representative metal promoters include rhenium, platinum, and palladium. Reference to groups of the Periodic Table are based on the "previous IUPAC form" as described in the Handbook of Chemistry and Physics (CPC Press), $68^{th}$ Ed. As discussed above, the particular catalyst system chosen, including the types and amounts of metal(s) and promoters, as well as the type of carrier, has a significant impact on the relative quantity of olefins obtained in the F-T synthesis, relative to paraffins.

The syngas used for F-T synthesis may be obtained from a wide variety of carbonaceous feedstocks through gasification (e.g., non-catalytic partial oxidation). Preferably, the syngas is obtained from gasification of biomass, although other suitable gasification feedstocks that do not necessarily include renewable carbon may also be used. If the product of F-T synthesis is not derived from any renewable carbon, then the renewable carbon of the resulting hydroprocessed biofuel may be only that portion of the total carbon in this composition that is obtained from the fatty acid- or triglyceride-containing component, and/or optionally an "aromatic-rich" component as described below. Carbonaceous feedstocks that are capable of being gasified to a mixture of hydrogen and carbon monoxide include coal (e.g., anthracite, brown coal, bituminous coal, sub-bituminous coal, lignite, and petroleum coke), bituminous oils, mineral crude oil or fractions (e.g., resids) thereof, and methane containing feedstocks (e.g., refinery gas, coal bed gas, associated gas, and natural gas). Processes for converting such feedstocks to syngas are described, for example, in "Gasification" by C. Higman and M van der Burgt, Elsevier Science (USA), 2003, ISBN 0-7506-7707-4, Ch. 4 and 5. If desired, the $H_2$:CO molar ratio obtained via gasification may be adapted for the specific Fischer-Tropsch catalyst and process. In case of syngas formed by gasification, this molar ratio is generally less than about 1, for example in the range from about 0.3 to about 0.9. It is possible to use such $H_2$:CO molar ratios in the Fischer-Tropsch synthesis, but more satisfactory results may be obtained by increasing this ratio, for example by performing a water-gas shift reaction or by adding hydrogen to the syngas mixture. According to preferred embodiments, the $H_2$:CO ratio in the syngas is at least about 1.5, for example in the range from about 1.6 to about 1.9.

Other Components

Further components may be included in the hydroprocessing feedstock, in addition to, or in place of, either the fatty acid- or triglyceride-containing component or the paraffin-rich component described above. For example, an "aromatic-rich" component may be used to provide a hydroprocessed biofuel having a significant quantity of aromatic hydrocarbons. A representative aromatic-rich component is derived from biomass and comprises a significant quantity, for example generally from about 5% to about 85%, and often from about 10% to about 75%, by weight of cyclic compounds, including cyclic organic oxygenates. The term "cyclic organic oxygenates" is meant to include compounds in which oxygen is incorporated into a ring structure (e.g., a pyran ring), as well as compounds (e.g., phenol) having a ring structure with oxygen being incorporated outside the ring structure. In either case, the ring structure may have from 3 to 8 ring members, be fused to other ring structures, and may be completely saturated (e.g., naphthenic), completely unsaturated (e.g., aromatic), or partially unsaturated. After hydroprocessing, these cyclic compounds, including cyclic organic oxygenates, can contribute to the total aromatics content of the hydroprocessed biofuel. These cyclic compounds are preferably obtained from natural sources, such as lignocellulosic biomass, as described above, that has been pyrolyzed to depolymerize and fragment the cyclic building blocks of cellulose, hemicellulose, and lignin. According to representative embodiments of the invention, the aromatic-rich component is derived from biomass subjected to pyrolysis in an oxygen depleted environment, for example using Rapid Thermal Processing (RTP).

Fast pyrolysis refers generally to technologies involving rapid heat transfer to the biomass feedstock, which is maintained at a relatively high temperature for a very short time. The temperature of the primary pyrolysis products is then rapidly reduced before chemical equilibrium is achieved. The fast cooling therefore prevents the valuable reaction intermediates, formed by depolymerization and fragmentation of the biomass building blocks, namely cellulose, hemicellulose, and lignin, from degrading to non-reactive, low-value final products. A number of fast pyrolysis processes are described in U.S. Pat. No. 5,961,786; Canadian Patent Application 536,549; and by Bridgwater, A. V., "Biomass Fast Pyrolysis," Review paper BIBLID: 0354-9836, 8 (2004), 2, 21-49. Fast pyrolysis processes include Rapid Thermal Processing (RTP), in which an inert or catalytic solid particulate is used to carry and transfer heat to the feedstock. RTP has been commercialized and operated with very favorable yields (55-80% by weight, depending on the biomass feedstock) of raw pyrolysis oil. The pyrolysis oil, as an aromatic-rich component, whether or not subjected to pretreating prior to hydroprocessing as described above, is normally characterized by a relatively high content of cyclic compounds, which is generally from about 10% to about 90%, and typically from about 20% to about 80%, by weight. These cyclic compounds are precursors to aromatic hydrocarbons obtained through their further reaction in the hydroprocessing step, which also beneficially decreases the oxygenate content and increases the heating value of the pyrolysis oil, as discussed in greater detail below.

According to other embodiments, cyclic compounds of an aromatic-rich component are obtained from rosin acids of tall oil or otherwise from oils derived from aromatic foliage such as eucalyptols. Tall oil refers to a resinous yellow-black oily liquid, which is namely an acidified byproduct of the kraft or sulfate processing of pine wood. Tall oil, prior to refining, is normally a mixture of rosin acids, fatty acids, sterols, high-molecular weight alcohols, and other alkyl chain materials. Distillation of crude tall oil may be used to recover a tall oil fraction that is enriched in the rosin acids, for use as an aromatic-rich component as described herein. The aromatic-rich component may therefore comprise tall oil either in its crude form or distilled (e.g., by vacuum distillation) to remove pitch (i.e., depitched tall oil) or otherwise distilled to concentrate the rosin acids, which are primarily abietic acid and dehydroabietic acid but include other cyclic carboxylic acids. As discussed above, the aromatic-rich component may in general be obtained after separation from (e.g., by fractionation), and/or pretreatment of, a raw pyrolysis oil or crude tall oil, prior to hydroprocessing. In the former case, raw pyrolysis oil is often subjected to pretreatment such as filtration to remove solids and/or ion exchange to remove soluble metals, prior to hydroprocessing.

Importantly, the aromatic-rich component can be hydroprocessed to provide cyclic hydrocarbons, including aromatic hydrocarbons in an amount governed by the equilibrium between homologous naphthenic and aromatic ring structures under hydroprocessing conditions of temperature and hydrogen partial pressure, as described herein. According to preferred embodiments, the aromatic-rich component is present in the combined hydroprocessing feedstock (including both the aromatic-rich and aromatic-lean components) in a quantity effective to obtain a hydroprocessed biofuel or hydroprocessed biofuel fraction (e.g., a hydroprocessed aviation biofuel) comprising aromatic hydrocarbons generally in an amount of at least 2% by volume, and typically in an amount of at least 3% by volume (e.g., from about 3% to about 25%, often from about 10% to about 20%, by volume). Due to the nature of the cyclic compounds of the aromatic-rich component, when derived from biomass, the aromatic hydrocarbons in the resulting hydroprocessed product or hydroprocessed biofuel fraction of this product (e.g., hydroprocessed aviation biofuel) generally include only minor amounts of benzene and toluene.

Hydroprocessing

The hydroprocessing feedstock components described above, including (i) a fatty acid- or triglyceride-containing component (e.g., an animal fat and/or plant-derived oil), (ii) a paraffin-rich component (e.g., a product of a BTL pathway involving gasification of biomass and Fischer-Tropsch synthesis), and/or (iii) an aromatic-rich component (e.g., pyrolysis oil and/or tall oil), are generally substantially or completely free of sulfur and aromatic hydrocarbons. However, these components also generally contain oxygenates. For example, animal fats and vegetable oils may have a total oxygen content generally in the range from about 5% to about 25% by weight, and often in the range from about 8% to about 15% by weight. Likewise, aliphatic alcohols, a byproduct of F-T synthesis, may be present in the paraffin-rich component, such that its total oxygen content is typically in the range from about 0.25% to about 10%, and often from about 0.5% to about 5% by weight. Furthermore, reactive olefins may be present in the paraffin-rich component in widely varying amounts, depending on the particular F-T synthesis catalyst system, process, and conditions used.

As discussed above, the paraffin-rich component is preferably obtained from BTL pathways. These also include combined coal to liquid/biomass to liquid (CTL/BTL) pathways, involving coal gasification, in which biomass is added to the CTL unit to improve the carbon footprint of the syngas used as a feed to F-T synthesis. For any BTL pathway involving gasification of biomass followed by Fischer-Tropsch synthesis, the paraffin-rich component contains predominantly paraffinic or olefinic hydrocarbons, depending on the Fischer-Tropsch catalyst system used. In either case, however, oxygenates are present as impurities (e.g., as aliphatic alcohols) in these hydrocarbons. Upgrading of the paraffin-rich component through hydroprocessing, which normally involves hydrotreating to remove oxygenates and other heteroatom-containing impurities, and possibly hydrocracking to reduce average molecular weight, is therefore beneficial for providing a desired fuel such as synthetic paraffinic kerosene (SPK). This hydroprocessed biofuel, however, cannot meet ASTM specifications (e.g., both density and aromatic content) for certain fuels, such as aviation fuel, without the addition of blend stocks, such as aromatic hydrocarbons.

Raw pyrolysis oil obtained from a feedstock comprising biomass, as described above, contains generally from about 20% to about 50%, and often from about 30 to about 40%, by weight of total oxygen, for example in the form of both (i) organic oxygenates, such as hydroxyaldehydes, hydroxyketones, sugars, carboxylic acids, and phenolic oligomers, and (ii) dissolved water. For this reason, although a pourable and transportable liquid fuel, the raw pyrolysis oil has only about 55-60% of the energy content of crude oil-based fuel oils. Representative values of the energy content are in the range from about 19.0 MJ/liter (69,800 BTU/gal) to about 25.0 MJ/liter (91,800 BTU/gal). Moreover, this raw product is often corrosive and exhibits chemical instability due to the presence of highly unsaturated compounds such as olefins (including diolefins) and alkenylaromatics. Hydroprocessing of this pyrolysis oil is therefore beneficial in terms of reducing its oxygen content and increasing its stability, thereby rendering the hydroprocessed product more suitable for blending in fuels, such as gasoline, meeting all applicable specifications. The term "pyrolysis oil," as it applies to a component of the hydroprocessing feedstock, refers to the raw pyrolysis oil obtained directly from pyrolysis (e.g., RTP) or otherwise refers to this raw pyrolysis oil after having undergone pretreatment such as filtration to remove solids and/or ion exchange to remove soluble metals, prior to the hydroprocessing step.

Likewise, naturally derived oils rich in cyclic compounds (and therefore useful as the aromatic-rich component in compositions and methods of the present invention), including pyrolysis oil, crude tall oil, and depitched tall oil, have a high oxygenate content. In the case of tall oil, for example, rosin acids (all multi-ring organic acids) are present in significant concentrations. Deoxygenation of these oxygenated cyclic compounds under hydroprocessing conditions beneficially yields aromatic hydrocarbons. In combination with oxygen removal, ring saturation and/or ring opening of at least one ring (but not all rings) of the multi-ring compounds leads to the formation of napthenic and/or alkylated cyclic hydrocarbons, respectively. Importantly, the naphthenic/aromatic hydrocarbon equilibrium under the particular hydroprocessing conditions used, may be used to govern the relative proportions of these species and thereby meet desired specifications for a particular application, for example the content of aromatic hydrocarbons in the hydroprocessed aviation biofuel.

Any of the hydroprocessing feedstock components may be hydroprocessed alone or in combination with other components that benefit from hydroprocessing, for example according to the particular methods described below. Certain aspects of the invention are associated with the operational synergies that may be obtained by co-processing the fatty acid- or triglyceride-containing component, the paraffin-rich component, and/or other components of a hydroprocessing feedstock as described herein. Co-processing not only achieves similar objectives (e.g., oxygenate removal) but also produces a hydroprocessed biofuel meeting a number of important product specifications, for example cetane number and cold flow properties in the case of a diesel fuel, or aromatic content in the case of jet fuel. According to some embodiments, blending of the hydroprocessed biofuel with petroleum derived fuel and/or further processing, is not required to achieve an "on-spec" fuel.

Hydroprocessing which includes hydrotreating (e.g., hydrodeoxygenation) and optionally hydrocracking reactions, involves contacting the combined, aromatic-rich and aromatic-lean components with hydrogen and in the presence of a suitable hydroprocessing catalyst, generally under conditions sufficient to convert a large proportion of the organic oxygenates in the combined hydroprocessing feedstock to CO, $CO_2$ and water that are easily separated from the hydroprocessed product. The hydrogen may be present in one or more streams, as discussed in greater detail below. The hydrogen may be substantially pure (e.g., as makeup or fresh hydrogen) or relatively impure (e.g., as recycle hydrogen), as long as sufficient hydrogen partial pressure is maintained in the reaction environment to achieve the desired performance (e.g., conversion, catalyst stability, and product aromatic content).

According to particular embodiments of the invention, hydroprocessing feedstock components (e.g., the fatty acid- or triglyceride-containing component and the paraffin-rich component) may be mixed or combined prior to the resulting mixture being contacted with any hydrogen. In other embodiments, one component may be contacted with hydrogen upstream of contacting with the other component (which may similarly have been contacted with a separate hydrogen stream). Optionally, streams containing different components (either or both of which having been previously contacted with hydrogen) may be combined and optionally contacted with hydrogen, for example as a separate hydrogen stream. According to yet further embodiments, streams containing portions of any the hydroprocessing feedstock components (any of which, any combination of which, or all of which having been previously contacted with hydrogen) may be combined and the combined streams optionally contacted further with hydrogen. The important consideration is that, at some point in the hydroprocessing, the aromatic-rich and aromatic-lean components are in the presence of the same hydroprocessing catalyst and conditions, thereby gaining efficiencies and other advantages associated with co-processing, as described above.

Typical hydroprocessing conditions include an average catalyst bed temperature from about 40° C. (104° F.) to about 454° C. (850° F.), often from about 150° C. (302° F.) to about 426° C. (800° F.), and a hydrogen partial pressure from about 3.5 MPa (500 psig) to about 21 MPa (3000 psig), often from about 6.2 MPa (800 psig) to about 10.5 MPa (1500 psig). In addition to pressure and temperature, the residence times of the hydroprocessing feedstock component(s) the presence of hydroprocessing catalyst (e.g., disposed in one or more catalyst beds or zones) can also be adjusted to increase or decrease the reaction severity and consequently the quality of the resulting hydroprocessed biofuel. With all other variables unchanged, lower residence times are associated with lower reaction severity. The inverse of the residence time is closely related to a variable known as the Liquid Hourly Space Velocity (LHSV, expressed in units of $hr^{-1}$), which is the volumetric liquid flow rate over the catalyst bed divided by the bed volume and represents the equivalent number of catalyst bed volumes of liquid processed per hour. Therefore, increasing the LHSV or hydroprocessing feedstock flow rate, processed over a given quantity of catalyst, directionally decreases residence time and the conversion of undesirable compounds present in this oil, such as organic oxygenate compounds. A typical range of LHSV for mild hydrotreating according to the present invention is from about 0.1 $hr^{-1}$ to about 10 $hr^{-1}$, often from about 0.5 $hr^{-1}$ to about 3 $hr^{-1}$. The quantity of hydrogen used may be based on the stoichiometric amount needed to convert organic oxygenates to hydrocarbons and $H_2O$. In representative embodiments, hydroprocessing is carried out in the presence of hydrogen in amount ranging from about 90% to about 600% of this stoichiometric amount.

The hydroprocessing catalyst may be present in the form of a fixed bed of particles comprising a catalytically active metal disposed on a support, with suitable metals and supports being described below. Otherwise the catalyst, either supported or otherwise unsupported (e.g., in the form of fine particles of a compound containing the catalytically active metal), may be used in a back-mixed bed, such as in the case of a slurry reactor. Homogeneous systems operating with catalysts that are soluble in the reactants and products may also be used. Catalytic hydroprocessing conditions will vary depending on the quality of the hydroprocessed biofuel desired, with higher severity operations directionally resulting in greater conversion of organic oxygenates and other undesirable compounds (e.g., reactive olefins and diolefins) by hydrogenation.

Suitable hydroprocessing catalysts include those comprising of at least one Group VIII metal, such as iron, cobalt, and nickel (e.g., cobalt and/or nickel) and at least one Group VI metal, such as molybdenum and tungsten, on a high surface area support material such as a refractory inorganic oxide (e.g., silica, alumina, titania, and/or zirconia). A carbon support may also be used. A representative hydroprocessing catalyst therefore comprises a metal selected from the group consisting of nickel, cobalt, tungsten, molybdenum, and mixtures thereof (e.g., a mixture of nickel and molybdenum), deposited on any of these support materials, or combinations of support materials. The choice of support material may be influenced, in some cases, by the need for corrosion resistance in view of the presence of aqueous acids, for example in the aromatic-rich component (e.g., pyrolysis oil) as a feedstock to hydroprocessing.

The Group VIII metal is typically present in the hydroprocessing catalyst in an amount ranging from about 2 to about 20 weight percent, and normally from about 4 to about 12 weight percent, based on the volatile-free catalyst weight. The Group VI metal is typically present in an amount ranging from about 1 to about 25 weight percent, and normally from about 2 to about 25 weight percent, also based on the volatile-free catalyst weight. A volatile-free catalyst sample may be obtained by subjecting the catalyst to drying at 200-350° C. (392-662° F.) under an inert gas purge or vacuum for a period of time (e.g., 2 hours), so that water and other volatile components are driven from the catalyst.

Other suitable hydroprocessing catalysts include zeolitic catalysts, as well as noble metal catalysts where the noble metal is selected from palladium and platinum. It is within the scope of the invention to use more than one type of hydroprocessing catalyst, for example both a hydrotreating catalyst and a hydrocracking catalyst as discussed below, in the same or a different reaction vessel, with these vessels being configured for series flow or parallel flow operation. Two or more hydroprocessing catalyst beds of the same or different catalyst and one or more quench points may also be utilized in a reaction vessel or vessels to provide the hydroprocessed biofuel.

After hydroprocessing, the resulting hydroprocessed biofuel has an oxygen content that is generally reduced from about 90% to about 100% (i.e., complete or substantially complete oxygen removal), relative to the total oxygen present in the hydroprocessing feedstock, for example the oxygen present in the combined fatty acid- or triglyceride-containing components, optionally after any pretreatment prior to hydroprocessing. Importantly, the heating value, on a mass basis, of the hydroprocessed biofuel is simultaneously increased, for example about 10-30% depending on the particular components and their proportions in the hydroprocessing feedstock, compared to that of the hydroprocessing feedstock. Fractionation or other separation methods may be used to separate various fractions of the hydroprocessed product (or total hydroprocessing effluent), which includes the hydroprocessed biofuel such as a hydroprocessed aviation biofuel. These fractions or hydroprocessed biofuels, in addition to having been fractionated may also be obtained after other treatments including catalytic reaction (e.g., for further oxygen removal) and/or adsorption. The separated, hydroprocessed biofuel fraction may then, according to some embodiments, be blended with comparable petroleum derived fractions and possibly other suitable additives.

In addition to a hydroprocessed aviation biofuel (or hydroprocessed jet biofuel or SPK fraction), other fractions that may be recovered from separation (e.g., fractionation) of the hydroprocessed product include a hydroprocessed naphtha biofuel (or hydroprocessed gasoline biofuel), and/or a hydroprocessed diesel biofuel. Likewise, lower boiling point range fractions may also be recovered, and these include, for example, a hydroprocessed renewable liquefied petroleum gas (LPG) analogue. After hydroprocessing and fractionation, the hydroprocessed biofuel fractions described above, including hydroprocessed aviation biofuel, comprise predominantly hydrocarbons, typically at least about 90% hydrocarbons (e.g., from about 90% to about 99.9% hydrocarbons) by weight, and often at least about 97% hydrocarbons (e.g., from about 97% to about 99.5% hydrocarbons) by weight.

A hydroprocessed aviation biofuel may therefore be separated from the hydrocarbon-containing products of hydroprocessing, based on boiling point or relative volatility, in a distillation column capable of carrying out a suitable number of theoretical stages of equilibrium contacting between rising vapor and falling liquid. According to a representative embodiment, a hydroprocessed aviation biofuel may have an initial boiling point (or "front-end") temperature characteristic of $C_5$ hydrocarbons, for example from about 30° C. (86° F.) to about 40° C. (104° F.) and a distillation end point temperature generally from about 138° C. (280° F.) to about 300° C. (572° F.), and typically from about 145° C. (293° F.) to about 288° C. (550° F.). These initial boiling point temperature ranges are also characteristic of hydroprocessed naphtha biofuel, but the distillation end point temperature range for this hydroprocessed biofuel fraction are generally less, for example in the range from about from about 110° C. (230° F.) to about 149° C. (300° F.), and typically from about 121° C. (250° F.) to about 143° C. (290° F.). A hydroprocessed diesel biofuel (i.e., "green diesel") may have an initial boiling point (or "front-end") temperature of at least about 260° C. (500° F.), typically at least about 274° C. (525° F.) (e.g., in the range from about 274° C. (525° F.) to about 343° C. (650° F.). The distillation end point of this hydroprocessed biofuel is generally close to that of vacuum gas oil (VGO), and is therefore typically at most about 593° C. (1100° F.) (e.g., in the range from about 510° C. (950° F.) to about 593° C. (1100° F.)), and often at most about 566° C. (1050° F.). These boiling point temperatures, which are also characteristic of respective petroleum derived diesel fuel and aviation fuel fractions, are measured according to ASTM D86.

A hydroprocessed aviation biofuel component or other hydroprocessed biofuel fraction, therefore, may be separated by fractionation from lower boiling hydrocarbons contained in a more volatile component (e.g., a hydroprocessed analogue of LPG) and/or higher boiling hydrocarbons contained in a less volatile component (e.g., a hydroprocessed kerosene biofuel and/or a hydroprocessed diesel biofuel). According to preferred embodiments, the separated, lower boiling hydrocarbons comprise $C_4$ hydrocarbons (e.g., butanes and butenes) as well as lower boiling compounds, such that these lower boiling hydrocarbons may be referred to a $C_4^-$ hydrocarbons. To further reduce the GHG emission value, based on LCA, of a given hydroprocessed biofuel component, at least a portion of these biomass-derived $C_4^-$ hydrocarbons are advantageously used to generate at least a portion of the hydrogen required for contacting with the hydroprocessing feedstock components during the hydroprocessing.

The conversion of the lower boiling hydrocarbons, contained in a less valuable, hydroprocessed biofuel fraction, to hydrogen, can reduce or even eliminate the need for an external source of hydrogen. This external hydrogen, if derived from fossil fuel, would otherwise add to the carbon footprint associated with the production of the hydroprocessed biofuel described herein, thereby increasing the GHG emissions based on LCA. Integrated hydrogen production is therefore beneficial in minimizing the GHG emissions exhibited by any of the hydroprocessed biofuel fraction(s) associated with the present invention. According to particular embodiments, the $C_4^-$ hydrocarbons are catalytically reformed in the presence of steam. Representative steam reforming catalysts include alumina supported nickel oxide.

Whether or not integrated hydrogen production is used, the oxygen content remaining in the hydroprocessed biofuel or other hydroprocessed biofuel fraction(s) described above is a function of the severity of the hydroprocessing operation, with higher severity resulting in a higher conversion of organic oxygenates to CO, $CO_2$, and water, which may be easily removed. While a reduction in organic oxygenates directionally increases heating value, this improvement in the quality of a hydroprocessed biofuel fraction is achieved at the expense of increased energy required for the hydroprocessing operation. Optimization of the organic oxygen content is therefore possible, depending on the particular biomass used as feedstock, the particular fuel (or fuel blend) composition, and its intended end use (e.g., for land transport, in the case of gasoline or diesel fuels that allow more than trace quantities of oxygenates).

Representative hydroprocessed biofuel fractions, other than hydroprocessed aviation biofuel, generally contain from about 0.001% to about 5%, typically from about 0.02% to about 4%, and often from about 0.05% to about 3%, by weight of organic oxygenates that are relatively refractory under hydroprocessing conditions. These ranges also apply to cyclic organic oxygenates (e.g., phenol and alkylated phenols), which normally account for most or substantially all of the organic oxygenates of a given hydroprocessed biofuel fraction(s). In view of these amounts of cyclic organic oxygenates a given hydroprocessed biofuel fraction, representative fuel compositions (e.g., containing one or more petroleum derived fractions) that are blended with such a hydroprocessed biofuel fraction will generally contain from about 0.0005% to about 2.5%, typically from about 0.01% to about 2%, and often from about 0.025% to about 1.5%, by weight of cyclic organic oxygenates. According to other embodiments, these ranges may be representative of the total phenol content, including alkylated phenols, in the fuel composition. In the case of hydroprocessed aviation biofuel, the total oxygen content remaining after hydroprocessing, fractionation, and optionally additional treatments as described above, is generally less than 0.5% by weight to meet ASTM thermal stability test specifications for aviation fuel. The hydrocarbon content of such aviation biofuels is therefore generally at least about 99.5% by weight, and the aromatic hydrocarbon content is as discussed above.

The hydroprocessed biofuels, as described above, also advantageously share a number of important characteristics, such as energy content, with their petroleum derived counterpart components. In the case of a hydroprocessed aviation biofuel, for example, this fraction may have a lower heating value generally from about 42 MJ/kg (18,100 BTU/lb) to about 46 MJ/kg (19,800 BTU/lb) and typically from about 43 MJ/kg (18,500 BTU/lb) to about 45 MJ/kg (19,400 BTU/lb). While these hydroprocessed biofuel fractions can meet various standards required of their petroleum derived counterparts, their carbon footprint is greatly reduced according to U.S. government GHG emission accounting practices, in which emissions associated with the combustion of biomass derived fuels are not reported in the GHG emission value based on LCA, as discussed above. According to particular embodiments of the invention, in which the hydroprocessed biofuel or other hydroprocessed biofuel fraction(s) is derived completely from biomass and/or other renewable carbon sources, the lifecycle greenhouse gas emission value of such biofuel fraction(s), based on $CO_2$ equivalents, is/are generally from about 5 g $CO_2$-eq./MJ (11.6 lb $CO_2$ eq./mmBTU) to about 50 g $CO_2$-eq./MJ (116.3 lb $CO_2$-eq./mmBTU), typically from about 15 g $CO_2$-eq./MJ (34.9 lb $CO_2$ eq./mmBTU) to about 35 g $CO_2$-eq./MJ (81.3 lb $CO_2$-eq./mmBTU), and often from about 20 g $CO_2$-eq./MJ (46.5 lb $CO_2$-eq./mmBTU) to about 30 g $CO_2$-eq./MJ (69.8 lb $CO_2$-eq./mmBTU), as measured according to guidelines set forth by the Intergovernmental Panel on Climate Change (IPCC) and the U.S. federal government. LCA values of emissions in terms of $CO_2$ equivalents, from raw material cultivation (in the case of plant materials) or raw material extraction (in the case of fossil fuels) through fuel combustion, can be calculated using SimaPro 7.1 software and IPCC GWP 100a methodologies.

According to representative fuel compositions associated with the present invention, the hydroprocessed biofuels, as described above, may be blended with a petroleum derived aviation fuel or other petroleum derived fraction that is present in the resulting fuel composition in an amount from about 30% to about 98% by weight. According to particular fuel compositions, (i) generally from 1 to about 50%, and typically from 1 to about 30%, of the hydroprocessed biofuel fraction (e.g., a hydroprocessed distillate biofuel) by weight is blended with (ii) generally from about 30% to about 99%, and typically from about 50% to about 98% of a petroleum derived fraction (e.g., a petroleum derived distillate fuel) by weight.

Representative Methods and Associated Flowschemes

The FIGURE depicts a representative process for hydroprocessing of feedstocks, and particularly those containing at least some renewable (e.g., biomass derived) carbon as described above. According to this embodiment, a hydroprocessing feedstock 2 (e.g., comprising two or more components in the case of co-processing) is combined with a "short" recycle oil 4 exiting hot high pressure separator 300. Short recycle oil 4, generally having a mass flow rate that is several times, for example generally from about 2 to about 8 times, often from about 3 to about 5 times, greater than that of hydroprocessing feedstock 2, acts as a heat sink for absorbing exothermic reaction heat associated with hydroprocessing reactions. Short recycle oil 4 therefore effectively limits the adiabatic temperature rise associated with hydroprocessing reactions in the overall process.

The combined hydroprocessing liquid feed 6 is then subjected to hydroprocessing in at least two reaction zones to effectively upgrade hydroprocessing feedstock 2 as described above. In particular, hydroprocessing feedstock 2, now combined with recycled bottoms portion 4, is contacted, in a first reaction zone 100, with hydrogen contained in first recycled hydrogen portion 8. Conditions and catalyst present in first reaction zone 100 are effective primarily for carrying out deoxygenation of hydroprocessing feedstock 2 and providing a reactor effluent comprising a deoxygenated component, referred to as deoxygenated effluent 10. The conversion of oxygen in first reaction zone 100 to CO, $CO_2$, and $H_2O$ is generally at least about 85% (e.g., in the range from about 85% to about 99.9%) and often at least about 95% (e.g., in the range from about 95% to about 99%). Deoxygenation reactions occurring in first reaction zone 100 include reactions in which carbon and oxygen are removed from the oxygenates present in hydroprocessing feedstock (e.g., decarboxylation and decarbonylation), as well as reactions in which oxygen is removed but not carbon (e.g., deoxygenation). Representative conditions in first reaction zone 100 (or deoxygenation zone) include an average catalyst bed temperature from about 200° C. (392° F.) to about 400° C. (752° F.) and a moderate pressure from about 700 kPa (100 psig) to about 7 MPa (1000 psig). The LHSV in first reaction zone 100 generally ranges from about 0.5 $hr^{-1}$ to about 10 $hr^{-1}$.

Deoxygenated effluent 10 is then contacted, preferably without any intermediate separation (e.g., to remove water, CO, $CO_2$, propane, and/or hydrogen) in second reaction zone 200, with hydrogen contained in second recycled hydrogen portion 12. Conditions and catalyst present in second reaction zone 200 are effective primarily for carrying out hydrocracking, and optionally hydroisomerization, of deoxygenated effluent 10 and providing a hydrocracked effluent 14. Hydrocracking reactions occurring in second reaction zone 200 include those in which hydrocarbons, generated from deoxygenation of oxygenates in first reaction zone 100, are converted to lower molecular weight (cracked) hydrocarbon products, including more valuable hydrocarbons suitable (e.g., having the appropriate boiling points) for use in any of the hydroprocessed biofuels (e.g., hydroprocessed diesel biofuel) described herein. As shown in the FIGURE, first and second reaction zones 100, 200 may be separated (e.g., in separate hydrotreating and hydrocracking reactors) to better maintain independent conditions within each of these zones. Alternatively, first and second reaction zones may be disposed within a common reactor vessel and optionally separated by the introduction of hydrogen-containing recycle gas portions.

Catalysts present in first and second reaction zones 100, 200, according to the particular embodiment depicted in the FIGURE, are generally useful for catalyzing deoxygenation and hydrocracking, respectively. These catalysts may be the same or different and include any of the hydroprocessing catalysts described above. Likewise, conditions in reaction zones 100, 200 may be the same or different, although in general at least either the catalyst or the conditions should be varied in the different zones to achieve desired results. Preferably, different catalysts are used, for example, catalysts having different support or carrier materials. In some cases, the catalyst and conditions in second reaction zone 200 may be chosen for their effectiveness in catalyzing both hydrocracking and hydroisomerization, thereby enhancing the yield of isoparaffins, which can improve the quality of certain hydroprocessed biofuels, such as hydroprocessed diesel biofuel in terms of reducing its pour point and cloud point temperatures. Catalysts useful in the first reaction zone also include the hydrogenation or hydrotreating catalysts described in US 2009/0077866. Also, the isomerization catalysts described in this publication may be used, at least in part, in the second reaction zone. Other catalysts useful in the first reaction zone include the hydrotreating catalysts and mixtures of these catalysts for use in a hydrotreating zone (e.g., a denitrification and desulfurization reaction zone), as described in U.S. Pat. No. 6,190,535 and U.S. Pat. No. 6,638,418. Other catalysts useful in the second reaction zone include the hydrocracking catalysts and mixtures of these catalysts for use in a hydrocracking zone, as described in U.S. Pat. No. 6,190,535 and U.S. Pat. No. 6,638,418. US 2009/0077866, U.S. Pat. No. 6,190,535, and U.S. Pat. No. 6,638,418 are incorporated by reference herein with respect to their disclosures of these catalysts.

In a representative embodiment, the catalytically active metals (e.g., nickel and molybdenum) may be the same in both reaction zones, whereas the support material used in first reaction zone 100 (or deoxygenation zone) may be an alumina-phosphorous mixture while the support material used in second reaction zone 200 (or hydrocracking zone) may be an amorphous or zeolitic silica-alumina, such that the catalyst used in second reaction zone has a higher acidity. In general, it is preferred that the acidity of the catalyst used in second reaction zone 200 exceeds that of the catalyst used in first reaction zone 100, thereby improving the tendency of second reaction zone to catalyze the desired cracking reactions. If catalyst blends are used in either or both of first and second reaction zones 100, 200, then the acidity of the blend is based on a weighted average value of acidity of the individual catalysts. Acidity may be determined, for example in units of moles of acid sites per gram of catalyst, by temperature programmed desorption (TPD) of a quantity of ammonia, from an ammonia-saturated sample of the catalyst, over a temperature from 275° C. (527° F.) to 500° C. (932° F.), which is beyond the temperature at which the ammonia is physisorbed. The quantity of acid sites therefore corresponds to the number of moles of ammonia that is desorbed in this temperature range.

Both deoxygenated effluent 10 and hydrocracked effluent 14 are therefore effluents of hydroprocessing reactors, which may, according to embodiments of the invention, undergo separation (e.g., fractionation) to recover various biofuels described above. According to the particular embodiment depicted in the FIGURE, hydrocracked effluent 14 is contacted with hydrogen-containing stripping gas, which may include some or all of the hydrogen contained in third recycled portion 16, make-up hydrogen 18, and/or generated hydrogen 20 from hydrogen generation unit 500 (e.g., catalytic steam reformer). This hydrogen-containing stripping gas and hydrocracked effluent 18 are fed to separator 300 (typically a hot high pressure product stripper) to selectively separate at least a portion of hydroprocessed product 22 as an overhead portion exiting separator 300. Conditions in separator 300 are preferably controlled to target the separation of (i) $C_{15}$ hydrocarbons and lower boiling compounds, present in hydrocracked effluent 14, into hydroprocessed product 22, as an overhead portion exiting separator 300 and (ii) $C_{16}$ hydrocarbons and higher boiling compounds, present in hydrocracked effluent 14, into short recycle oil 4, as a bottoms portion exiting separator 300.

According to the representative embodiment of the FIGURE, short recycle oil 4 generally comprises at least about 80% (e.g., from about 80% to about 99.9%), and often comprises at least about 90% (e.g., from about 90% to about 99%), by weight of the $C_{16}^+$ hydrocarbons entering separator 300. The quality of separation achieved in separator 300 is such that short recycle oil 4 comprises $C_{16}^+$ hydrocarbons in an amount generally of at least about 90%, and typically at least about 95%, by weight. Likewise, hydroprocessed product 22 generally comprises at least about 80% (e.g., from about 80% to about 99.9%), and often comprises at least about 90% (e.g., from about 90% to about 99%), by weight of the $C_{15}^-$ hydrocarbons entering separator 300 (e.g., as an effluent from a hydroprocessing reactor such as hydrocracked effluent 14). In a representative processes (e.g., targeting aviation fuel production), hydroprocessed product 22 generally can comprise less than about 20% (e.g., from about 1% to about 20%), and often comprises less than about 10% (e.g., from about 1% to about 10%), by weight of the $C_{15}^-$ hydrocarbons entering separator 300 (e.g., as a effluent from a hydroprocessing reactor such as hydrocracked effluent 14). In such processes, this separation can result in a hydroprocessed product comprising $C_{15}^-$ hydrocarbons (on a CO, $CO_2$, and water-free basis) in an amount generally of at least about 90%, and typically at least about 95%, by weight.

The particularly desired separation of $C_{15}^-$ hydrocarbons into hydroprocessed product 22 and $C_{16}^+$ hydrocarbons into short recycle oil 4 is normally aided using some or all of the hydrogen entering separator 300, for example in third recycled portion 16, make-up hydrogen 18, and/or generated hydrogen 20, as hydrogen-containing stripping gas, such that separator 300 functions as a hot high pressure hydrogen stripper to effectively accomplish this selective separation. In addition to operating separator 300 at sufficiently high temperature, the recovery of desired hydrocarbons into their respective vapor and liquid phases (or overhead and bottoms portions) exiting separator 300 as hydroprocessed product 22 and short recycle oil 4 may be improved using packing material or trays within separator 300 to improve vapor-liquid contacting and provide multiple theoretical equilibrium contacting stages. According to one embodiment, the use of packing material below the point of entry of hydrocracked effluent 14 provides a "stripping stage," allowing additional contact of a liquid portion of hydrocracked effluent 14, which is not initially flashed, with stripping gas in this stage. Separator 300, as well as the downstream separation equipment (e.g., an additional high pressure separator) in product recovery section 400 used to separate recycle hydrogen 24, is normally operated at nearly the same pressure as first and second reaction zones 100, 200, reduced only by the normal pressure drop through process equipment. This minimizes energy (compression) costs, required to recycle hydrogen and thereby beneficially maintain this expensive resource within the reaction system after it is separated.

As discussed above, short recycle oil 4 beneficially functions as a heat sink to limit the temperature rise across first and second reaction zones 100, 200 for a given level of deoxygenation and hydrocracking conversion and associated heat release (exotherm). Short recycle oil 4 additionally transports a significant amount of dissolved hydrogen, with which short recycle oil 4 is normally saturated at the operating pressure of separator 300, back to first and second reaction zones 100, 200. This "pre-solubilized" source of hydrogen is believed to improve reaction kinetics, particularly with respect to establishing the liquid-phase hydrogen concentration (in equilibrium with the vapor-phase hydrogen partial pressure), as needed for the desired hydroprocessing reactions to proceed at a favorable rate.

Moreover, the "short" recycle path from separator 300 to hydroprocessing feedstock 2 (or, alternatively, to first and second reaction zones 100, 200) advantageously avoids the need to process short recycle oil 4 in product recovery section 400, thereby reducing the size of downstream separation equipment (e.g., distillation columns) and consequently the associated costs. As discussed above, a significant quantity of oil in the "short" recycle path is obtained when separator 300 achieves a separation of hydrocracked effluent 14, such that all or substantially all $C_{16}^+$ hydrocarbons are maintained in the bottoms liquid phase exiting as short recycle oil 4. The quantity of short recycle oil 4 is increased, according to preferred embodiments, by maintaining a per-pass (once-through) conversion in second reaction zone 200 (or hydrocracking zone) of generally less than about 50% (e.g., from about 5% to about 50%) and typically less than about 40% (e.g., from about 10% to about 40%) to limit the extent of molecular weight reduction achieved in hydrocracked effluent 14 and consequently the amount of material that is vaporized into hydroprocessed product 22 as an overhead portion exiting separator 300.

Short recycle oil 4 may be recycled, optionally together with "long recycle oil 26," which may be a recycled portion of a hydroprocessed product fraction, such as hydroprocessed diesel biofuel fraction 28. According to the particular embodiment of the FIGURE, a non-recycled portion of hydroprocessed diesel biofuel fraction 28 is removed as a product, namely hydroprocessed diesel biofuel 30.

Product recovery section 400 includes separation equipment (e.g., separators and distillation columns providing single and multi-stage vapor-liquid equilibrium separations) to resolve hydroprocessed biofuels and other product fractions including, for example, hydroprocessed naphtha biofuel 32 (or hydroprocessed gasoline) and/or hydroprocessed aviation biofuel 34 (or hydroprocessed jet biofuel), as well as $CO_2$-rich fraction 36, hydroprocessed renewable LPG analogue 38, and water 40. Hydroprocessed product 22 may therefore be fractionated to recover hydroprocessed diesel biofuel fraction 28 in addition to these other hydroprocessed biofuels and product fractions. As discussed above, the carbon footprint associated with the production of these and other hydroprocessed biofuels may be reduced using optional hydrogen generation unit 500 (e.g., catalytic steam reformer) for producing generated hydrogen 20 that provides all or a portion of the hydrogen requirement needed in the overall process for (i) chemical consumption in first and second reaction zones 100, 200, in addition to (ii) the replacement of solution losses in liquid product streams and mechanical losses in process equipment. As shown in the FIGURE, optional generated hydrogen 20 may be combined with a source of make-up hydrogen 18 to provide this hydrogen requirement.

Overall, aspects of the invention are associated with methods of making fuel compositions comprising contacting, with hydrogen, a feedstock to a hydroprocessing, thereby providing a hydroprocessed biofuel. The feedstock may comprise two or more components, such as a fatty acid- and triglyceride-containing component and a paraffin-rich component, to exploit efficiencies and synergies associated with co-processing. Further aspects are associated with fuel compositions comprising a hydroprocessed biofuel, such as hydroprocessed diesel biofuel or hydroprocessed aviation biofuel, obtained from this hydroprocessing. Representative methods for carrying out the hydroprocessing include single-stage processes described herein, in which hydrogen-containing recycle gas is circulated through both a hydrodeoxygenation zone and a hydrocracking zone in series. Those having skill in the art, with the knowledge gained from the present disclosure, will recognize that various changes could be made in these methods, as well as compositions made by these methods, without departing from the scope of the present invention. Mechanisms used to explain theoretical or observed phenomena or results, shall be interpreted as illustrative only and not limiting in any way the scope of the appended claims.

The following example is set forth as representative of the present invention. The example is not to be construed as limiting the scope of the invention as other equivalent embodiments will be apparent in view of the present disclosure and appended claims.

EXAMPLE

A pilot plant scale operation was used to evaluate the hydroprocessing of a commercial soybean oil feed to provide hydroprocessed biofuels. The flowscheme, as described above, included first and second reactors, namely hydrodeoxygenation and hydrocracking/hydroisomerization reactors in series and a hot hydrogen stripper to separate the effluent from the second reactor. In particular, the hot hydrogen stripper provided an overhead fraction that was further processed for (i) separation of recycle hydrogen by flashing and scrubbing (for $CO_2$ removal) and (ii) resolution of hydrocarbon fractions boiling in representative ranges for naphtha [$C_5$-132° C. (270° F.)], jet fuel or SPK [132° C. (270° F.)-279° C. (535° F.)], and diesel fuel [279° C. (535° F.) and heavier]. The bottoms fraction from the hot hydrogen stripper was recycled back to combine with the feed, at an approximately 5:1 combined feed ratio by weight.

The catalysts used in the first and second reactors, both having nickel and molybdenum as active metals, effectively deoxygenated, hydrocracked, and hydroisomerized the feed to provide biofuels meeting applicable quality standards. The catalyst in the first reactor included an alumina-phosphorous support material, in contrast to the more acidic, amorphous or zeolitic support material of the catalyst in the second reactor.

Operation of the pilot plant was stable over the entire testing period, lasting several weeks. Varying the process conditions, such as the temperatures of the first and second reactors, allowed the product slate to be adjusted, for example biased toward a higher yield of jet fuel at the expense of diesel fuel. In general, the process achieved very competitive yields relative to conventional processes. For example, in a representative operation targeting jet fuel production, the overall conversion level of soybean oil to hydrocarbons boiling at or below 279° C. (535° F.) was greater than 85%, and often greater than 90%, with a typical yield of jet fuel in the range of 50%-70% by weight. Moreover, an isoparaffin:normal paraffin ratio of 3 to 6, and often 3.5 to 6, was obtained, indicating a high quality hydroprocessed jet biofuel could be obtained with this process and catalyst system, which advantageously reduces operating and equipment costs, relative to conventional processes.

The invention claimed is:

1. A method for making a fuel composition, the method comprising:
   contacting a fatty acid- or triglyceride-containing component and a paraffin-rich component with hydrogen under catalytic hydroprocessing conditions to provide a hydroprocessed biofuel product, wherein the paraffin-rich component is derived from biomass by a combination of gasification and Fischer-Tropsch synthesis;
   fractionating the hydroprocessed biofuel product of the contacting of the fatty acid or triglyceride-containing component and the paraffin-rich component with hydrogen, wherein fractionating comprises feeding a hydrogen-containing stripping gas into a hot high pressure separator to selectively separate the hydroprocessed biofuel product into an overhead portion exiting the hot high pressure separator;
   further fractionating the overhead portion comprising the hydroprocessed biofuel product to recover lower boiling hydrocarbons comprising $C_4^-$ hydrocarbons and generating, from at least a portion of the $C_4^-$ hydrocarbons, at least a portion of the hydrogen for contacting with the fatty acid- or triglyceride-containing component and the paraffin-rich component; and
   wherein the hydroprocessed biofuel product comprises a hydroprocessed aviation biofuel comprising less than about 10% of the $C_{16}$ hydrocarbons entering the separator as an effluent from a hydroprocessing reactor.

2. The method of claim 1, wherein the paraffin-rich component comprises olefinic hydrocarbons and oxygenated compounds.

3. The method of claim 1, wherein the biomass is selected from the group consisting of hardwood, softwood, hardwood bark, softwood bark, corn fiber, corn stover, sugar cane bagasse, switchgrass, miscanthus, algae, waste paper, construction waste, demolition waste, municipal waste, and mixtures thereof.

4. The method of claim 1, wherein the fatty acid or triglyceride-containing component is obtained from an animal fat, a plant-derived oil, or a combination thereof.

5. The method of claim 1, wherein the fatty acid or triglyceride-containing component comprises from about 5% to about 25% of oxygen by weight.

6. The method of claim 1, wherein the contacting with hydrogen under catalytic hydroprocessing conditions results in both hydrotreating and hydrocracking reactions.

7. The method of claim 1, further comprising catalytically reforming at least the portion of the $C_4^-$ hydrocarbons in the presence of steam to generate at least the portion of the hydrogen for contacting with the fatty acid- or triglyceride-containing component and the paraffin-rich component.

* * * * *